Nov. 18, 1958    P. C. GARDINER ET AL    2,861,145
HIGH SPEED RELAY
Filed Aug. 31, 1953    3 Sheets-Sheet 1
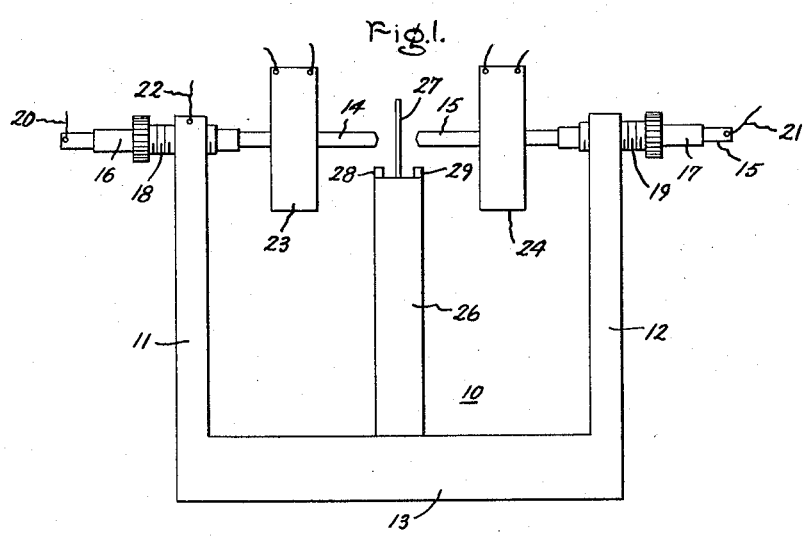
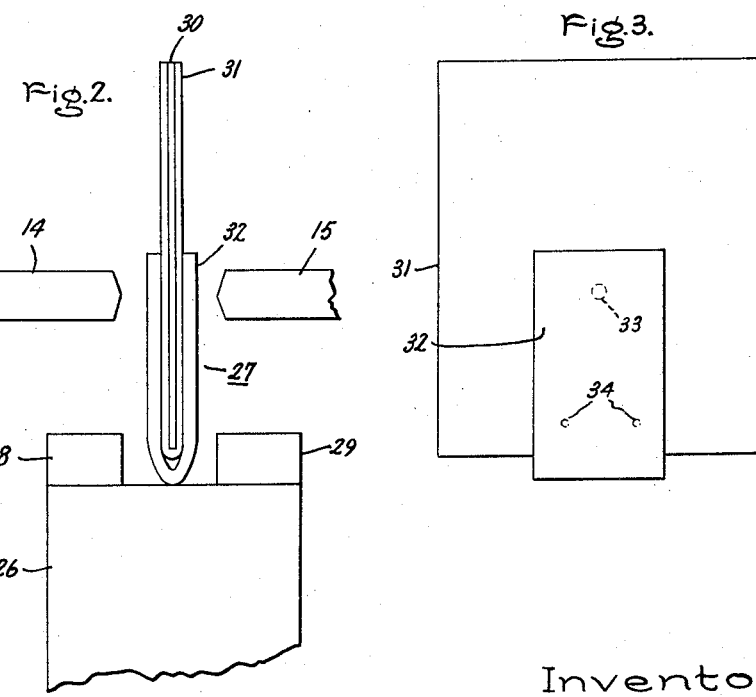
Inventors:
Paul C. Gardiner,
Alfred F. Bischoff,
by Rowell S. Mack
Their Attorney.

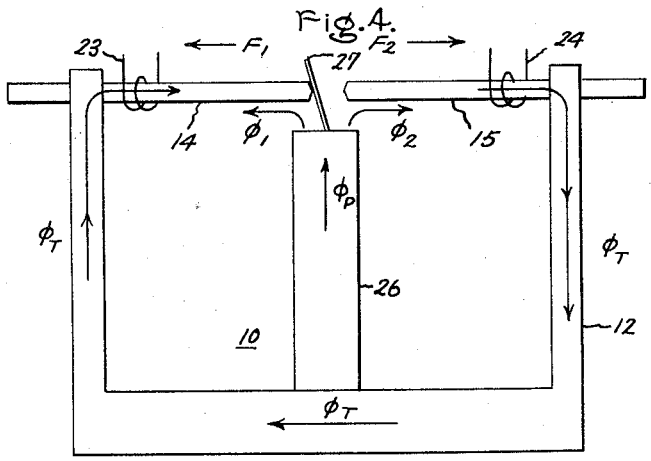
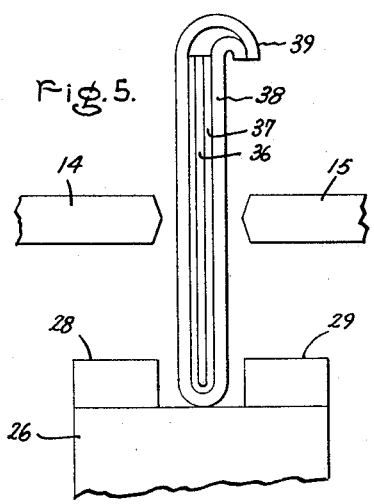
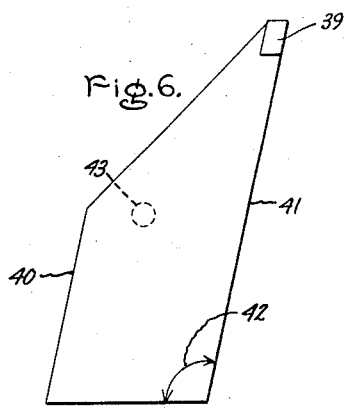
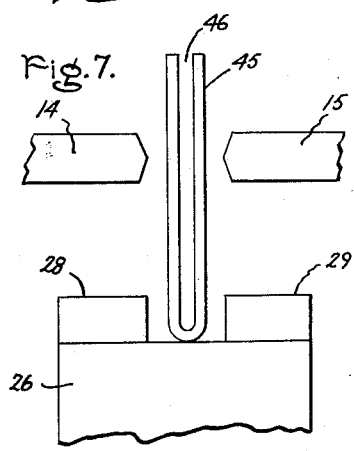
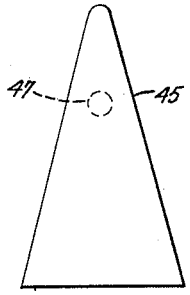

Nov. 18, 1958 P. C. GARDINER ET AL 2,861,145
HIGH SPEED RELAY
Filed Aug. 31, 1953 3 Sheets-Sheet 3
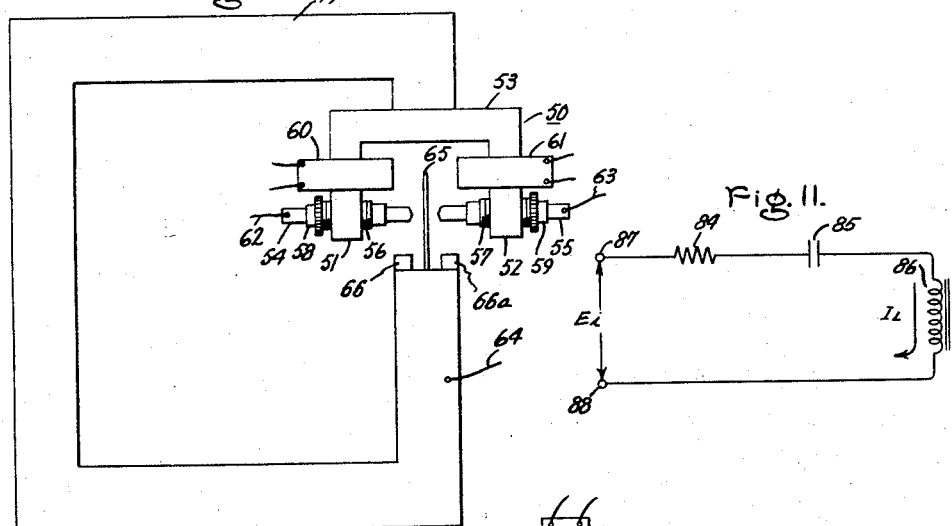
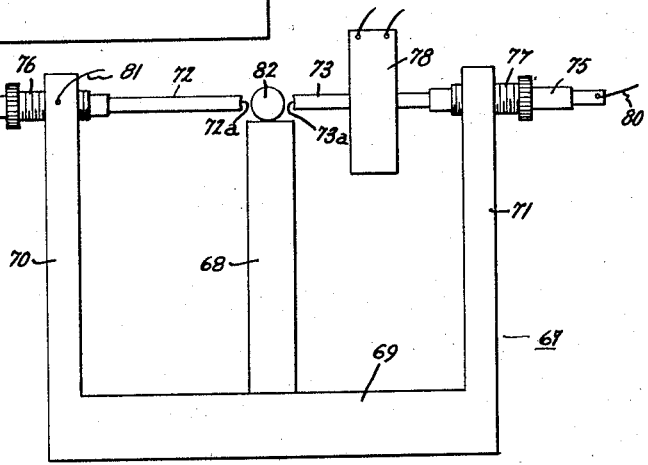
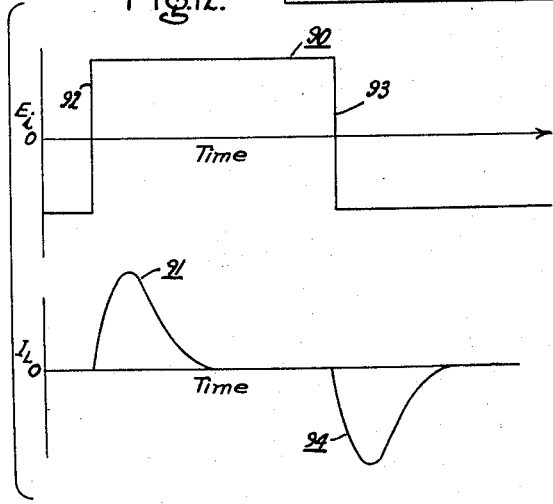
Inventors:
Paul C. Gardiner,
Alfred F. Bischoff,
by Rowell S. Mack
Their Attorney.

United States Patent Office 2,861,145
Patented Nov. 18, 1958

2,861,145

HIGH SPEED RELAY

Paul C. Gardiner, Scotia, and Alfred F. Bischoff, Ballston Spa, N. Y., assignors to General Electric Company, a corporation of New York Application August 31, 1953, Serial No. 377,356

17 Claims. (Cl. 200—93)

This invention pertains to electromagnetic relays, and more particularly to a high speed relay of the type having a polarized armature.

Present day developments in the field of electronics have created a need for a high speed relay having certain performance capabilities not embodied in presently known relays, which are subject to limitations such as low speed, poor life, or unreliable performance. Therefore, an object of the present invention is to provide a high speed relay which obviates these difficulties and which may be reliably operated over a long period of time.

Another object is to provide such a device which may be actuated by voltage pulses of alternately opposite polarity, and in which the armature will lie statically in the position to which it is thrown by an input pulse until it is dislodged and driven to the other position by an input pulse of opposite polarity.

Another object is to provide a high speed relay in which the action of the armature is positive, and in which the armature does not bounce away from the position to which it is thrown.

Another object is to provide a high speed relay having a voltage capacity which is substantially greater than heretofore possible in a relay of this type.

A further object is to provide a high speed relay of very small physical size, which is simple in construction and easy to manufacture.

A form of the present invention in which the foregoing objects are attained comprises a core of magnetic material having two outer members joined by a crosspiece, and an operating winding for inducing flux in the core. A polarizing magnet has one end secured to the crosspiece of the core and an armature is positioned on the free end of the magnet and extends upwardly between the ends of the outer members of the core. The armature is responsive to the polarity of current through the operating winding selectively to be attracted toward one or the other of the outer members of the core, and it will remain in the position to which it is thrown even though current no longer flows in the operating winding.

The new relay employs an armature, which is retained in position on the free end of the polarizing magnet by magnetic attraction alone, and is movable across the surface of the magnet. The armature has very small mass, and the force exerted on it when current flows through the operating winding is such that its acceleration is extremely fast. Therefore, it is thrown from one position to the other in an exceedingly short time. In addition, the armature is so designed and so mounted on the polarizing magnet that a substantial amount of the kinetic energy resulting from its movement from one position to the other is absorbed, and this feature in combination with others to be later described tends to prevent the armature from bouncing away from the position to which it is thrown.

Further objects, features and advantages of the invention will become apparent from the following description, taken in conjunction with the accompanying drawings, in which Fig. 1 is a side view of one form of the invention;
Fig. 2 is an enlarged side view of the armature shown in the relay of Fig. 1;
Fig. 3 is a front view of the armature shown in Fig. 2;
Fig. 4 is a diagrammatic side view of the relay of Fig. 1, showing magnetic flux relationships useful in understanding the operation of the relay;
Fig. 5 is a side view of a modified form of armature;
Fig. 6 is a front view of the armature of Fig. 5;
Fig. 7 is a side view of another form of armature;
Fig. 8 is a front view of the armature of Fig. 7;
Fig. 9 is a side view of a modified form of relay;
Fig. 10 is a side view of another form of the invention;
Fig. 11 is a schematic diagram of a pulse shaping circuit into which the operating winding of the relay may be connected; and
Fig. 12 is a diagram of waveforms illustrating the action of the circuit shown in Fig. 11.

One form of the new relay, which is shown in Fig. 1, comprises a U-shaped core or yoke 10 having spaced apart end portions or outer members 11 and 12 joined by a crosspiece 13. The core or yoke is made of a high permeability magnetic material and, in this particular embodiment, is of solid rather than laminated construction, and is approximately one inch wide and three-quarters of an inch high. As is well-known, the losses occurring in a laminated core are less than those occurring in a solid core. However, the slight improvement in performance of the relay, which results from the use of laminated rather than solid construction, is more than offset by the mechanical difficulties inherent in the construction of a laminated core. If desired, the core or yoke may be made of powdered iron, or ferrite, which may be pressed into shape, and which, in general, embodies the advantages of laminated construction.

Coaxially mounted near the outer ends of the outer members 11 and 12 of the yoke are pole pieces 14 and 15, respectively, which are secured within thin insulating sleeves 16 and 17, respectively, which in turn are secured within bushings 18 and 19, respectively. The pole pieces 14, 15 extend inwardly toward each other, and their bushings are threaded through the end portions or outer members of the core in order that the air gap between the opposed inner ends of the pole pieces may be conveniently adjusted. Electrical connections 20, 21, and 22 are made to the pole pieces 14 and 15 and yoke 10, respectively, so that the pole pieces serve as contact elements of the relay.

Operating windings 23 and 24 are mounted on pole pieces 14 and 15, respectively, for inducing flux in the magnetic circuit defined by the core and the pole pieces. The operating windings may be mounted on the yoke itself, if desired, but in the preferred embodiment they are mounted on the pole pieces as shown. The pole pieces 14, 15 are of smaller cross-sectional area than the outer members 11, 12 of the yoke, and, when the operating windings are mounted on the pole pieces, the transient flux in the pole pieces may be built up more quickly than when the windings are mounted on the yoke. Thus, the operating windings may be physically smaller as well as have less inductance, which in turn results in faster current build-up in the windings when a square wave of driving voltage is impressed across them, and materially increases the speed of operation of the relay. It has also been found that the relay may be operated efficiently when only one operating winding is employed, instead of the two windings shown.

A polarizing magnet 26, which in this instance is a bar type of permanent magnet made of a low permeability high retentivity material, is medially located between the outer members with one end secured to the cross-piece 13 of the yoke and its other end located adjacent the opposed inner ends of the pole pieces 14, 15. A reed-like armature 27 is movably retained on the smooth free end of the polarizing magnet 26 by magnetic attraction alone, and extends upwardly between the opposed ends of the pole pieces. Stops 28 and 29, which are of a non-magnetic material such as brass, are secured to the upper end of the magnet 26 on each side of the armature 27 and spaced therefrom so that the base of the armature is free to move within the area defined by the stops.

The rectangular armature 27, which is shown in detail in Figs. 2 and 3, is composed of three elements. A thin piece of silver-plated iron 30 is folded inside a thin strip of aluminum 31 of the same width to form three substantially coextensive rectangular layers, and these elements are folded inside another silver-plated iron strip 32. The outer iron strip 32 extends to a point on the armature just above the points 33 at which the armature contacts the pole pieces of the relay, and enfolds only about half of the length of the inner iron strip 30 and folded aluminum strip 31. The outer iron strip 32 is also approximately half as wide as the inner strips, which serve as vanes to aid in preventing bounce, as will be later described in detail. The inner aluminum and iron strips are pressed inside the folded outer iron strip and may be center-punched or spot welded, as at 34, to prevent sliding with respect to one another. The armature may be made in various sizes, but it has been found that quite satisfactory operation results when it is constructed of an inner iron strip 30 which is .001 inch thick, an aluminum strip 31 .001 inch thick, and an outer iron strip 32 .002 inch thick, with the inner strips being approximately one-quarter inch wide and five-sixteenths inch high. Of course, such an armature has extremely small mass, which, in this instance, is of the order of .001–.002 gram.

The armature is held on the smooth top of the polarizing magnet 26 only by the attraction of the magnet, and is not mechanically fastened thereto. However, it has been found that it will not be shaken out of place by the forces encountered in normal use, because, in the preferred embodiment, the force exerted on the armature by the permanent magnet is of the order of one thousand times the weight of the armature.

In operation, assuming that the operating windings are not energized, the armature 27 will remain in the illustrated position for only an instant. Any external force which tends to displace the armature from its center position will cause it to be attracted to the nearest of the pole pieces, which acts as poles of a magnet having polarity opposite to that of the armature. It will remain against this pole piece until dislodged and attracted to the other pole piece by a force caused by energization of the operating winding. When the armature is lying statically against one of the pole pieces, the lines of polarizing flux flowing through the armature and the pole piece against which it is lying exceed those flowing through the armature and the other pole piece. Therefore, the force exerted on the armature in the direction of the pole piece against which it is lying exceeds that exerted in the other direction, and the armature will remain against the pole piece to which it is thrown even after current ceases to flow through the operating winding.

The time which is required to move the armature from one pole piece to the other may be expressed as $$t = \sqrt{\frac{2d}{a}}$$

where $d$ is the distance the armature must travel, and $a$ is the effective acceleration of the armature. Thus, the time of operation may be shortened by decreasing the space between the opposed tips of the pole pieces, or by increasing the acceleration of the armature.

The operating time cannot be greatly reduced by decreasing the spacing between the opposed ends of the pole pieces alone, because, when the air gap becomes too small, arcing may occur between the pole tips. The forms of the invention described herein have been designed for operation in air with differences in potential between the pole pieces of approximately 300 volts, and, in general, it has been found that under average conditions the spacing between the pole tips must be such that the armature travels at least .002 inch in order to maintain this potential difference without arcing. The spacing may be varied, of course, when using the relay in different applications, and the speed of operation of the relay will be varied in accordance with above formula. However, in order to maintain high speed operation, the air gap in the relay of the present invention is preferably limited to a value such that the armature travels less than approximately .005 inch.

It is apparent that to decrease the operating time without reducing the air gap, the acceleration of the armature must be increased. As is well-known, the acceleration of a body may be expressed by the term $$a = \frac{F}{m}$$

where F is the force acting on the body, and $m$ is the mass of the body. Thus, the acceleration of the armature may be increased by increasing the force acting on it, or by decreasing the mass of the armature. The armature illustrated in Figs. 2 and 3 has been made as small as possible without sacrificing other important operational qualities later to be described, and, as was previously pointed out, its mass is of the order of .001–.002 gram.

In order to better understand the forces acting on the armature, which contribute to the high speed operation of the new relay, reference is made to Fig. 4, which shows diagrammatically the relay of Fig. 1. It is seen that polarizing flux $\phi_p$ is set up by the permanent magnet 26, which, at the top of the permanent magnet, divides into flux $\phi_1$ flowing through the armature 27 and pole piece 14 against which it is lying, and flux $\phi_2$ flowing through the armature, the air gap and through pole piece 15. Because the armature is resting against pole piece 14, flux $\phi_1$ is greater than flux $\phi_2$, and, of course, the sum of flux $\phi_1$ and flux $\phi_2$ is equal to flux $\phi_p$. Now let it be assumed that operating windings 23 and 24 are energized and that current flows in them of the proper polarity to cause transient flux $\phi_T$ to flow in a clockwise direction around the magnetic circuit defined by the yoke and pole pieces. For purposes of illustration it is assumed that there is no leakage flux. It is apparent that now the flux flowing through pole piece 14 is equal to the difference between flux $\phi_T$ and flux $\phi_1$, and the flux flowing through pole piece 15 is equal to the sum of flux $\phi_T$ and $\phi_2$. It is known that the force exerted on the armature to move it toward a pole piece is proportional to the square of the flux passing between the armature and the pole piece. Thus, the force $F_1$ acting to move the armature toward pole piece 14 may be expressed as $$F_1 = K_1(\phi_T - \phi_1)^2$$

where $K_1$ is a constant containing the cross-sectional area of pole piece 14; and the force $F_2$ acting to move the armature toward pole piece 15 may be expressed as $$F_2 = K_2(\phi_T + \phi_2)^2$$

where $K_2$ is a constant containing the cross-sectional area of pole piece 15. The force $F_T$ acting on the armature to move it from one position to another is equal to the difference between $F_1$ and $F_2$, which, since $F_2$ is obviously larger than $F_1$ in this instance, may be written as $$F_T = K[(\phi_T + \phi_2)^2 - (\phi_T - \phi_1)^2]$$

where K is a constant containing the cross-sectional area of pole pieces 14 and 15, which are assumed to be equal. By collecting terms and substituting, it is found that $$F_T = K[2\phi_T\phi_p + \phi_2^2 - \phi_1^2]$$

Thus, by making both the polarizing flux $\phi_p$ and transient flux $\phi_T$ large, great force can be exerted on the armature to throw it from one position to the other. The difference between $\phi_1$ and $\phi_2$ should be as large as reasonably obtainable, in order to provide maximum static stability when the operating winding is not energized and $\phi_T$ is zero. As seen by the expression for $F_T$, making the difference between $\phi_1$ and $\phi_2$ large does affect $F_T$. However, the sum of $\phi_1$ and $\phi_2$, which equals $\phi_p$, is made as large as reasonably possible, but it is much smaller than $\phi_T$. Thus, because of the relative magnitudes of $\phi_T$ and $\phi_p$, the difference between $\phi_1$ and $\phi_2$ has little effect on $F_T$. These conditions are met in the relay of the present invention.

The amount of flux which passes through the armature may be limited by the area of the armature in a plane normal to the direction of the flux. Therefore, the area of the armature lying between the pole pieces is made approximately as large as or larger than the cross-sectional area of the pole pieces, while the cross-sectional area of the armature is small. Thus, the armature is capable of carrying a large amount of transient flux $\phi_T$ induced by current in the operating windings, while the mass of the armature remains small. The cross-sectional area of the armature through which the polarizing flux $\phi_p$ passes is large enough to carry the amount of polarizing flux required for positive, efficient operation.

The construction of the relay is such that the transient flux $\phi_T$ need not pass through the permanent magnet 26, but only passes through the soft iron core and pole pieces, the air gap and the armature. In the foregoing example, it was assumed that this condition existed, and the assumption is valid because, while the yoke 10 and the pole pieces 14 and 15 are made of a high permeability soft iron, the permanent magnet 26 is preferably made of an aluminum-nickel-cobalt-iron alloy having low magnetic permeability and high retentivity. Thus, the natural tendency for the flux to follow a path through material having the highest permeability results in little or no transient flux flowing through the permanent magnet.

In the relay shown in Fig. 1, with a space between the ends of the pole pieces equal to the thickness of the armature plus approximately .002 inch, the time required to move the armature from one position to the other is of the order of 100 microseconds. This operating time can be obtained consistently, and is a conservative value. Thus, the relay is approximately 10 times as fast as presently known relays of this type. It has been found that the life of the new relay is in excess of $20 \times 10^6$ operations, when carrying 5 milliamperes of direct current and 300 volts on the contacts.

Relays of the types presently known and used are often limited in their speed of operation because of contact bounce. That is, when a relatively great force is exerted on the armature and the armature is thrown from one position to the other, it will bounce away from the pole piece toward which it is thrown several times before it finally comes to rest. In the relay of the present invention, this difficulty is eliminated by the novel design of the armature, and the novel manner of its connection to the polarizing magnet. As seen in Figs. 2 and 3, the armature there shown contacts the pole pieces at a point 33 near the top of the outer fold of iron 32. The inner iron strip 30 and the aluminum strip 31 serve as vanes and contribute to the prevention of bounce. When the armature is thrown from one pole piece to the other by the transient force, some of the kinetic energy possessed by the armature is dissipated as the fold of the outer iron strip 32 skids across the top of the permanent polarizing magnet 26.

After the bottom of the armature contacts the stops and the outer iron strip 32 contacts the pole piece, the vanes extending above the contact point tend to "overshoot" and "whip" somewhat, and further dissipate the energy. In addition, the aluminum strip 31 is soft and thus tends to absorb energy. It is also to be noted that the three strips are not bonded to each other, but are merely pressed together and spot welded or center punched in order to prevent slipping. Therefore, there is a slight opening between the layers, which provides a cushion of air between them. Additional energy is thus dissipated by driving out the air from between the layers, after the motion of the armature has been stopped by contacting a pole piece. It has been found that this form of armature may be thrown from one pole piece to the other at a very high speed, and will operate consistently with little or no bounce.

Various modified forms of armatures may be used in the relay, and a design which has proven very successful is illustrated in Figs. 5 and 6. The armature there shown comprises an iron strip 36 .001 inch thick, folded within an aluminum strip 37, .001 inch thick, and these two folded within a silver-plated iron strip 38 .002 inch thick, which is crimped at the top, as at 39. Thus, the armature is formed of fine substantially coextensive layers, and is of an unsymmetrical trapezoidal shape, having parallel sides 40 and 41, with the side 41 being approximately twice the length of side 40. The fold at the bottom of the armature which joins the parallel sides 40 and 41 makes an angle 42 with the side 41 which is slightly greater than 90°. Thus, the center of gravity of the armature is displaced from the contact area 43 toward the long side 41. The natural tendency of an armature to bounce is counteracted in this case by several features. First, the three strips comprising the armature are not bonded together but merely pressed nearly into contact and, therefore, there is a slight cushion of air between the strips. As previously explained, some of the energy remaining after the armature has contacted the pole piece is expended by driving out the air from between the strips. Of course, the skidding of the bottom of the armature across the top of the magnet as the armature is thrown from one pole piece to the other also absorbs some energy. In addition, a definite advantage is gained by having the center of gravity of the armature displaced from the contact area. After the armature has struck the pole piece toward which it is thrown, the bottom of the armature tends to rub back and forth somewhat on the top of the magnet and thus expend any remaining energy. The weight of this armature is approximately .001–.002 gram, and it may be used under the same conditions as the armature described in connection with Figs. 2 and 3 and possesses the same advantages.

Another type of armature which is effective in combating bounce is shown in Figs. 7 and 8. This armature consists of a silver-plated iron strip 45 .002 inch thick folded in the form of a U having an air gap 46 between the arms .002 inch wide. The armature is of inverted V shape which avoids the simple resonance effects that may sometimes be observed with a more rectangular shape, and the contact area 47 is located well above the center of the armature. In this form of armature, bouncing is prevented by the absorptive effect of the air gap 46 between the arms, in addition to the effect of the skidding of the fold of the armature across the top of the permanent magnet. After the movement of the armature has been stopped by contact with the pole piece, the arm of the armature which is not in contact with the pole piece may vibrate for a short time and thus dissipate any remaining kinetic energy. It has also been found that the performance of the armature is excellent when the gap between the arms contains a viscous fluid, retained therein by capillary action.

It is seen that in all of the forms of armature described, the area of the armature through which the transient flux due to the operating windings passes is considerably greater than the cross-sectional area of the pole pieces, and so does not limit the amount of transient flux passing therethrough. The cross-sectional area of the armature through which the polarizing flux from the permanent magnet passes is small, and the weight of all of the armatures described is approximately .001–.002 gram. All are designed for use in the relay of this invention, in which the armature is retained on the polarizing magnet by magnetic attraction alone, and in which the base of the armature skids across the surface of the magnet as the armature is thrown from one position to the other.

Another form of relay constructed in accordance with the invention is shown in Fig. 9. This form of relay comprises a C-shaped permanent magnet 49 and a U-shaped yoke 50, having outer members 51 and 52 and a cross-piece 53. The cross-piece 53 of the yoke is secured to one end of the C-shaped permanent polarizing magnet 49, with the outer members 51 and 52 of the yoke extending toward the other end of the permanent magnet. Pole pieces 54 and 55 are coaxially mounted in the outer members 51 and 52, respectively, by means of bushings 56 and 57, respectively, which may be threaded into the outer members to provide convenient adjustment of the gap between the opposed ends of the pole pieces. The pole pieces are insulated from the outer members by thin non-conducting sleeves 58 and 59, respectively. Operating windings 60 and 61 are mounted on the outer members 51 and 52 of the yoke for inducing flux in the magnetic circuit defined by the yoke and the pole pieces, and electrical connections 62, 63, and 64 are made to the pole pieces 54 and 55, and the permanent magnet 49, respectively. A reed-like armature 65 is movably retained on top of the free end of the permanent magnet 49 between stops 66 and 66a by magnetic attraction alone.

The method of operation of this form of the relay is essentially the same as that previously described for the relay shown in Fig. 1. The only substantial difference between the relay shown in Fig. 9 and that shown in Fig. 1 lies in the use of a C-shaped polarizing magnet rather than a bar type, and in both forms of relay the transient flux which throws the armature need not pass through the low permeability polarizing magnet.

In Fig. 9, the operating windings 60 and 61 are shown mounted on the outer members of the yoke 50. However, it is apparent that either one or two operating windings may be mounted on the pole pieces 54 and 55, and the same advantages derived therefrom as were previously explained with reference to Fig. 1. The reed-like armatures which have been described may be used with equal facility in either of the relays and their use is not limited to one type or the other.

A modified form of relay, which employs a ball type of armature, is shown in Fig. 10. This relay is generally similar to that shown in Fig. 1, and comprises a U-shaped yoke 67 of high permeability magnetic material, and a permanent bar polarizing magnet 68 having one end secured to the cross-piece 69 of the yoke and being medially disposed between the outer members 70 and 71 of the yoke. Pole pieces 72 and 73 are coaxially mounted in the outer members 70 and 71, respectively, by means of thin insulating sleeves 74 and 75, which fit within bushings 76 and 77 threaded through the outer members of the yoke. An operating winding 78 may be mounted on one of the pole pieces (as shown) or on the yoke, or two operating windings may be mounted on the pole pieces or yoke, and electrical connections 79 and 80 are made to the pole pieces 72 and 73, respectively, and a similar connection 81 is made to the yoke.

A ball type of armature 82 is positioned on top of the polarizing magnet 68 between the opposed ends 72a and 73a of the pole pieces. The armature is a silver-plated steel ball approximately .030 inch in diameter and weighing approximately .002 gram, which is held on the smooth top of the magnet 68 only by magnetic force of the order of 1000 times the weight of the armature.

The method of operation of this form of the invention is substantially the same as that previously described, and the flux and force relationships like those discussed with reference to Fig. 4. It is also apparent that the ball type of armature may be used in the form of relay shown in Fig. 9, and it will embody the same operational features as when used in the form of relay shown in Fig. 10.

One of the advantages of the ball armature lies in the reduction of friction between the armature and the polarizing magnet on which it rests. In addition, the shape of the ball armature does not limit the amount of polarizing flux passing therethrough compared to the amount of transient flux passing therethrough, because its cross-sectional area, taken on any plane passing through its center, is approximately as large as that of the pole pieces. The mass of the ball is fairly small, and the relay employing the ball armature is capable of operating at similar speeds to the one employing a reed-like armature.

The principal disadvantage of the ball armature is that it has more tendency to bounce than has the reed-like armature. This tendency is combatted by the fact that the tips 71a of the pole pieces are shaped to match the curvature of the armature. Therefore, when the armature is thrown from one position to the other, the majority of its kinetic energy is expended in overcoming the resistance of the air which must be expelled from the pocket before the ball can come to rest against the pole piece. Once the armature has been seated against the tip of a pole piece, it is deterred from bouncing away from the pole piece by the action of the vacuum created between the matching surfaces of the ball and pole piece tip.

It is now apparent that in all the forms of the invention described the pole pieces and armature serve as electrical contacts, as well as elements of the magnetic circuit. Thus, the armature is not required to carry heavy contacts, and the magnetic force acting on the armature need not overcome the inertia of such added mass. Even though the pole pieces must be electrically insulated from the yoke, the magnetic circuit is negligibly affected, because the insulating sleeves which surround the pole pieces may be made quite thin. In addition, considerable advantage is gained by simultaneously providing contact spacing adjustment and pole tip spacing adjustment.

The forms of the invention described herein are designed to be actuated by pulses of alternately opposite polarity. A voltage pulse of the proper polarity applied to the operating windings will cause the armature to be thrown from one pole to the other, and a pulse of the opposite polarity will then cause the armature to be returned to the first pole piece. The relay may, of course, be operated from square waves rather than pulses, but, in general, such actuating voltages tend to overheat the coils. Therefore, if the relay is to be operated from a source of continuous voltage which varies in polarity, it is desirable to convert the continuous voltage into pulses of the proper polarity to actuate the relay.

A circuit which may be employed for this purpose is illustrated in Fig. 11, and its action is illustrated by the waveforms shown in Fig. 12. The circuit comprises a resistor 84 and a capacitor 85 connected in series with the actuating winding 86 of the relay across input terminals 87 and 88. If an input voltage $E_i$ is impressed across terminals 87 and 88 and is of the form shown by curve 90 (Fig. 12), the current $I_L$, which will flow through the operating winding 86, will be of the form shown by curve 91. That is, as the voltage $E_i$ reverses its polarity, as at 92, the circuit acts according to well-known principles to differentiate the voltage and produce a positive current pulse of the form shown by curve 91. As the voltage $E_i$ again reverses its polarity, as at 93, the circuit again differentiates the voltage, and produces a negative pulse 94 of current through the circuit.

As is well-known, in a resistance-capacitance-inductance series circuit such as this, the value of the resistance relative to the inductance and capacitance is quite important, because, if the resistance is too small, the circuit will oscillate. Therefore, in order to properly shape the pulse, the value of the resistance 84 should be approximately equal to or greater than the critical resistance $R_c$, which may be determined by the formula $$R_c = 2\sqrt{\frac{L}{C}}$$

where L is the inductance of the operating winding 86 in henries, and C is the value of the capacitor 85 in farads.

It has been found in practice that a definite advantage is gained in preventing bouncing of the armature if the inductance of the operating winding and the value of the capacitor in series therewith are so chosen the the armature contacts the pole piece toward which it is thrown at a time when the current through the operating winding has risen to approximately one-third of its maximum value. When the relay is operated in this manner, there is an additional force available after the armature has contacted the pole piece to restrain the armature from bouncing away from the pole piece. Obviously, this practice does sacrifice some speed of operation, but the disadvantage is more than balanced by the fact that armature bounce may be completely eliminated.

It is now apparent that the present invention has provided a relay in which the time required to move the armature from one pole piece to the other is of the order of 100 microseconds, and, in practice, operation has been obtained in as little as 10 microseconds, when using a very small air gap between the pole pieces. The relay is physically very small and may conveniently be mounted on a conventional vacuum tube base, yet it provides positive efficient operation and long life without being complex or difficult to manufacture. It is capable of withstanding a potential difference between the contacts of at least approximately 300 volts without arcing, and its current-carrying capabilities are adequate for the usual applications in electronics circuitry. Such a high speed relay, embodying the described features to prevent armature bounce, fills a definite need in the art.

It is obvious that many changes and modifications may be made by one skilled in the art, and it is intended to be limited only by the true spirit of the invention and the scope of the appended claims.

What we claim as new and desire to secure by Letters Patent of the United States is:

1. A high speed relay comprising a core member, an operating winding for inducing flux in said core member, a contact element carried by and electrically insulated from said core member, a polarizing magnet having one end secured to said core member and the remaining end thereof positioned adjacent an end portion of said core member, an armature movably retained on the free end of said polarizing magnet by magnetic force and responsive selectively to the polarity of current in said operating winding to be attracted toward said end portion of said core member, thereby to engage said contact element, and electrical connections to said armature and said contact element.

2. A high speed relay comprising a core member having spaced apart end portions, a contact element carried by each of said end portions and electrically insulated therefrom, an operating winding for inducing flux in the magnetic circuit defined by said core and said contact elements, a polarizing magnet having one end secured to said core member and the remaining end positioned intermediate said end portions of said core, an armature movably retained on the free end of said polarizing magnet by magnetic force and responsive to the polarity of current in said operating winding selectively to be attracted toward said end portions of said core and thereby selectively to engage said contact elements, and electrical connections to said armature and said contact elements.

3. A high speed double-throw relay comprising a core having two outer members and a cross-piece, pole pieces carried by said outer members and extending inwardly toward each other, an operating winding for inducing flux in the magnetic circuit comprising said core and said pole pieces, a polarizing magnet having one end secured to said core, and an armature movably retained on the free end of said polarizing magnet by magnetic attraction, said armature extending between the inner ends of said pole pieces and being responsive to the polarity of current in said operating winding selectively to contact the inner ends of said pole pieces.

4. A high speed double-throw relay comprising a substantially U-shaped yoke having two outer members and a cross piece, pole pieces carried by and electrically insulated from said outer members, said pole pieces being axially aligned and having opposed inner ends, an operating winding for inducing flux in the magnetic circuit comprising said yoke and said pole pieces, a polarizing magnet having one end secured to said cross piece, an armature retained on the free end of said polarizing magnet in electrical contact therewith and extending between the opposed ends of said pole pieces, said armature being movably retained in position on said magnet by magnetic attraction and being responsive to the polarity of current in said operating winding selectively to contact the opposed ends of said pole pieces, the area of said armature lying between said pole pieces being at least approximately equal to the cross-sectional area of said pole pieces, and electrical connections to said pole pieces and said yoke.

5. A high speed double-throw relay comprising a substantially U-shaped yoke of high permeability magnetic material having two outer members and a cross piece, pole pieces carried by and electrically insulated from said outer members, said pole pieces extending inwardly toward each other and having opposed inner ends, an operating winding for inducing flux in the magnetic circuit defined by said yoke and said pole pieces, a permanent magnet of low permeability and high retentivity material having one end secured to said cross piece and its free end located adjacent the inner ends of said pole pieces, an armature retained on the free end of said permanent magnet in electrical contact therewith and extending between said opposed ends of said pole pieces, said armature being movably retained in position on said permanent magnet by magnetic force and being responsive to the polarity of current in said operating winding selectively to contact the opposed ends of said pole pieces, the area of said armature lying between said pole pieces being at least approximately equal to the cross-sectional area of said pole pieces, and electrical connections to said yoke and said pole pieces.

6. A high speed double-throw relay comprising a substantially U-shaped yoke having two outer members and a cross piece, pole pieces carried by and electrically insulated from said outer members, said pole pieces being axially aligned and having opposed inner ends, an operating winding for inducing flux in the magnetic circuit comprising said yoke and said pole pieces, a polarizing magnet disposed between said outer members and having one end secured to said cross piece, an armature movably retained on the free end of said polarizing magnet in electrical contact therewith by magnetic attraction, said armature extending between the opposed ends of said pole pieces and being responsive to the polarity of current in said operating winding selectively to contact the opposed ends of said pole pieces, the area of said armature lying between said pole pieces, being at least equal to the cross-sectional area of said pole pieces, and electrical connections to said pole pieces and said armature.

7. A high speed double-throw relay comprising a substantially U-shaped yoke of high permeability magnetic material having two outer members and a cross piece, pole pieces carried by and electrically insulated from said outer members, said pole pieces being axially aligned and having opposed inner ends, an operating winding for inducing flux in the magnetic circuit defined by said yoke and said pole pieces, a permanent magnet of low permeability and high retentivity material disposed between said outer members and having one end secured to said cross piece and its free end located adjacent the inner ends of said pole pieces, an armature positioned on the free end of said permanent magnet in electrical contact therewith and extending between said opposed ends of said pole pieces, said armature being movable across said free end of said permanent magnet and retained in position thereon by magnetic attraction, said armature being responsive to the polarity of current in said operating winding selectively to contact the opposed ends of said pole pieces, the area of said armature lying between said pole pieces being at least substantially equal to the cross-sectional area of said pole pieces, and electrical connections to said yoke and said pole pieces.

8. A high speed double-throw relay comprising a substantially C-shaped polarizing magnet, a substantially U-shaped yoke having two outer members and a cross piece, said cross piece being attached to one end of said polarizing magnet, an operating winding for inducing flux in said yoke, and an armature positioned on said free end of said polarizing magnet and extending between the ends of said outer members of said yoke, said armature being movably retained on the end of said polarizing magnet by magnetic attraction alone and being responsive to the polarity of current in said operating winding selectively to be attracted towards said outer members.

9. A high speed double-throw relay comprising a substantially C-shaped permanent magnet of low permeability high retentivity material, a substantially U-shaped yoke of high magnetic permeability having two outer members and a cross piece, said cross piece being attached to one end of said C-shaped permanent magnet, pole pieces carried by and electrically insulated from said outer members, said pole pieces being axially aligned and having opposed inner ends, an operating winding for inducing flux in the magnetic circuit defined by said yoke and said pole pieces, an armature retained on the free end of said permanent magnet in electrical contact therewith and extending between said opposed ends of said pole pieces, said armature being movably retained on said permanent magnet by magnetic attraction and being responsive to the polarity of current in said operating winding selectively to contact the opposed ends of said pole pieces, said opposed ends of said pole pieces being spaced apart for movement of said armature from one to the other of less than approximately .005 inch, the area of said armature lying between said opposed ends of said pole pieces being at least approximately equal to the cross-sectional area of said pole pieces.

10. A high speed double-throw relay comprising a substantially U-shaped yoke having two outer members and a cross piece, an operating winding for inducing flux in said yoke, and a polarized ball armature rollably retained in position by magnetic force and disposed between the ends of said outer members, said armature being responsive to the polarity of current in said operating winding selectively to be attracted toward said outer members.

11. A high speed double-throw relay comprising a substantially U-shaped yoke having two outer members and a cross piece, an operating winding for inducing flux in said yoke, a polarizing magnet having one end attached to said cross piece, and a ball armature retained on the free end of said polarizing magnet by magnetic attraction and responsive to the polarity of current in said operating winding selectively to be attracted toward said outer members.

12. A high speed double-throw relay comprising a substantially U-shaped yoke of high permeability magnetic material having two outer members and a cross piece, pole pieces carried by and electrically insulated from said outer members, said pole pieces extending inwardly toward each other and having opposed inner ends, an operating winding for inducing flux in the magnetic circuit defined by said yoke and said pole pieces, a permanent polarizing magnet of low permeability and high retentivity material having one end secured to said cross piece and its free end located adjacent the inner ends of said pole pieces, a ball armature retained on the free end of said polarizing magnet in electrical contact therewith and disposed between said opposed ends of said pole pieces, said ball armature being movably retained in position on said polarizing magnet by magnetic force and being responsive to the polarity of current in said operating winding selectively to contact the opposed ends of said pole pieces, the opposed ends of said pole pieces being spaced apart for movement of said ball armature from one to the other of less than approximately .005 inch, the diameter of said ball armature being approximately equal to the diameter of said pole pieces, and electrical connections to said yoke and said pole pieces.

13. A high speed double-throw relay comprising a substantially U-shaped yoke having two outer members and a cross piece, pole pieces carried by and insulated from said outer members, said pole pieces being axially aligned and having opposed inner ends, an operating winding for inducing transient flux in the magnetic circuit comprising said yoke and said pole pieces, a polarized reed-like armature slidably retained in position by magnetic force and disposed between said opposed ends of said pole pieces, said armature being responsive to the polarity of current in said operating winding selectively to contact the ends of said pole pieces, the area of said armature lying between said pole pieces through which said transient flux passes being at least approximately equal to the cross-sectional area of said pole pieces and substantially greater than the cross-sectional area of said armature through which polarizing flux passes, and electrical connections to said pole pieces and said armature.

14. A high speed double-throw relay comprising a substantially U-shaped yoke of high permeability magnetic material having two outer members and a cross piece, pole pieces carried by and electrically insulated from said outer members, said pole pieces being axially aligned and having opposed inner ends, an operating winding for inducing transient flux in the magnetic circuit defined by said yoke and said pole pieces, a permanent magnet of low permeability and high retentivity material having one end secured to said cross piece and its free end located adjacent the inner ends of said pole pieces, a reed-like armature positioned on the free end of said permanent magnet in electrical contact therewith and extending between said opposed ends of said pole pieces, whereby polarizing flux passes from said permanent magnet through said reed-like armature, said armature being slidably retained in position on said permanent magnet by magnetic attraction and being responsive to the polarity of current in said operating winding selectively to contact the opposed ends of said pole pieces, the area of said armature lying between said pole pieces through which said transient flux passes being at least approximately equal to the cross-sectional area of said pole pieces and substantially greater than the cross-sectional area of said armature through which said polarizing flux passes, and electrical connections to said yoke and said pole pieces.

15. A high speed double-throw relay comprising a substantially U-shaped yoke having two outer members and a cross piece, pole pieces carried by and electrically insulated from said outer members, said pole pieces being axially aligned and having opposed inner ends, an operating winding for inducing flux in the magnetic circuit comprising said yoke and said pole pieces, a polarizing magnet having one end secured to said cross piece, an armature retained on the free end of said polarizing magnet in electrical contact therewith by magnetic attraction, said armature extending between the opposed ends of said pole pieces and being responsive to the polarity of current in said operating winding selectively to contact the opposed ends of said pole pieces, said armature comprising an inner iron strip, an aluminum strip folded about said inner iron strip to provide three substantially coextensive rectangular layers of equal thickness, and an outer iron strip folded about said aluminum strip, the fold in the outer iron strip being adjacent the fold in the aluminum strip and serving as the base of the armature, said iron strip being approximately one-half the length and width and twice the thickness of said aluminum strip.

16. A high speed double-throw relay comprising a substantially U-shaped yoke having two outer members and a cross piece, pole pieces carried by and electrically insulated from said outer members, said pole pieces being axially aligned and having opposed inner ends, an operating winding for inducing flux in the magnetic circuit comprising said yoke and said pole pieces, a polarizing magnet having one end secured to said cross piece, an armature retained on the free end of said polarizing magnet in electrical contact therewith by magnetic attraction, said armature extending between the opposed ends of said pole pieces and being responsive to the polarity of current in said operating winding selectively to contact the opposed ends of said pole pieces, said armature comprising an inner iron strip, an aluminum strip folded about said first iron strip, and an outer iron strip folded about said aluminum strip to provide five substantially coextensive layers, the fold in the outer iron strip being adjacent the fold in the aluminum strip and serving as the base of the armature, the armature being of unsymmetrically trapezoidal shape having two substantially parallel sides, one of said sides being approximately twice the length of the other and forming an angle with the base of said armature of more than ninety degrees.

17. A high speed double-throw relay comprising a substantially U-shaped yoke having two outer members and a cross piece, pole pieces carried by and electrically insulated from said outer members, said pole pieces being axially aligned and having opposed inner ends, an operating winding for inducing flux in the magnetic circuit comprising said yoke and said pole pieces, a polarizing magnet having one end secured to said cross piece, an armature retained on the free end of said polarizing magnet in electrical contact therewith by magnetic attraction, said armature extending between the opposed ends of said pole pieces and being responsive to the polarity of current in said operating winding selectively to contact the opposed ends of said pole pieces, said armature comprising a folded iron strip of substantial U shape having an air gap between its arms, said arms being substantially of inverted V shape, the vertex of the V being at the top of the armature opposite the fold which serves as the base of the armature.

References Cited in the file of this patent

UNITED STATES PATENTS

| | | |
|---|---|---|
| 409,675 | Field | Aug. 27, 1889 |
| 928,582 | Burlingame | July 20, 1909 |
| 1,030,811 | Henry | June 25, 1912 |
| 1,402,305 | Macfarlane | Jan. 3, 1922 |
| 2,510,700 | Lamb | June 6, 1950 |
| 2,580,123 | Pfleger | Dec. 25, 1951 |

FOREIGN PATENTS

| | | |
|---|---|---|
| 354,970 | Germany | June 17, 1922 |
| 407,348 | Italy | Dec. 30, 1944 |
| 591,975 | Great Britain | Sept. 3, 1947 |

UNITED STATES PATENT OFFICE

CERTIFICATE OF CORRECTION

Patent No. 2,861,145 November 18, 1958

Paul C. Gardiner et al.

It is hereby certified that error appears in the printed specification of the above numbered patent requiring correction and that the said Letters Patent should read as corrected below.

Column 6, line 70, for "polie" read -- pole --; column 13, line 17, after "said" insert -- outer --; column 14, line 2, for "symmetrically" read -- symmetrical --.

Signed and sealed this 7th day of April 1959.

(SEAL)
Attest:

KARL H. AXLINE
Attesting Officer

ROBERT C. WATSON
Commissioner of Patents